(12) United States Patent
Schaedler et al.

(10) Patent No.: US 10,899,169 B2
(45) Date of Patent: *Jan. 26, 2021

(54) WHEEL ASSEMBLIES WITH NON-PNEUMATIC TIRES

(71) Applicant: MTD PRODUCTS INC, Valley City, OH (US)

(72) Inventors: Axel Schaedler, Olmsted Township, OH (US); Peter J. Buchanan, Elyria, OH (US)

(73) Assignee: MTD PRODUCTS INC, Valley City, OH (US)

( * ) Notice: Subject to any disclaimer, the term of this patent is extended or adjusted under 35 U.S.C. 154(b) by 177 days.

This patent is subject to a terminal disclaimer.

(21) Appl. No.: 15/782,406

(22) Filed: Oct. 12, 2017

(65) Prior Publication Data

US 2018/0093528 A1  Apr. 5, 2018

Related U.S. Application Data

(63) Continuation-in-part of application No. 14/729,495, filed on Jun. 3, 2015, now abandoned.
(Continued)

(51) Int. Cl.
*B60B 15/02* (2006.01)
*B60B 25/00* (2006.01)
(Continued)

(52) U.S. Cl.
CPC .............. *B60B 15/025* (2013.01); *B60B 3/08* (2013.01); *B60B 3/087* (2013.01); *B60B 25/006* (2013.01);
(Continued)

(58) Field of Classification Search
CPC .. B60C 7/10; B60C 7/102; B60C 7/24; B60C 7/14; B60C 7/143; B60C 11/0311;
(Continued)

(56) References Cited

U.S. PATENT DOCUMENTS 1,165,512 A   12/1915   Jordan
1,343,154 A    6/1920   Ostmann
(Continued)

FOREIGN PATENT DOCUMENTS

EP   0159888   10/1985
EP   0530240    3/1993
(Continued)

OTHER PUBLICATIONS

International Search Report and Written Opinion for International Patent Application No. PCT/US2016/015055 filed Jan. 27, 2016.
(Continued)

*Primary Examiner* — Kip T Kotter
(74) *Attorney, Agent, or Firm* — Wegman Hessler

(57) ABSTRACT

A non-pneumatic tire assembly includes a non-pneumatic tire. The non-pneumatic tire includes an inner circumferential ring and an outer circumferential ring defining an annular space and a cylindrical space inside the inner circumferential ring. A plurality of partitions connect the circumferential rings within the annular space. A ground-contacting tread is located on the outer circumferential ring. A rim, including a plurality of pieces, is located within the cylindrical space. The non-pneumatic tire assembly further includes a hub that is removably connected to the rim.

17 Claims, 11 Drawing Sheets

Related U.S. Application Data

(60) Provisional application No. 62/108,112, filed on Jan. 27, 2015.

(51) Int. Cl.
  *B60C 11/03* (2006.01)
  *B60C 7/24* (2006.01)
  *B60C 11/18* (2006.01)
  *B60C 7/14* (2006.01)
  *B60B 3/08* (2006.01)
  *B60C 7/10* (2006.01)

(52) U.S. Cl.
  CPC ............. *B60C 7/143* (2013.01); *B60C 7/24* (2013.01); *B60C 11/0311* (2013.01); *B60C 11/18* (2013.01); *B60C 2007/107* (2013.01)

(58) Field of Classification Search
  CPC ........ B60C 2007/107; B60C 2007/146; B60B 3/08; B60B 3/087; B60B 3/14; B60B 3/147; B60B 3/16; B60B 23/00; B60B 25/06
  See application file for complete search history.

(56) References Cited

U.S. PATENT DOCUMENTS

| | | |
|---|---|---|
| 1,365,539 A | 1/1921 | Pepple |
| D57,363 S | 3/1921 | Lambert |
| 1,430,100 A | 9/1922 | Mitchell |
| D63,848 S | 1/1924 | Granville |
| 1,495,083 A | 5/1924 | Krusemark |
| D68,536 S | 10/1925 | Lenhoff |
| 1,584,785 A | 5/1926 | McCollough |
| 1,678,014 A | 7/1928 | Manly |
| 1,702,081 A | 2/1929 | Hatfield |
| 2,620,844 A | 12/1952 | Lord |
| 2,742,941 A | 4/1956 | Johnson |
| 3,030,998 A | 4/1962 | Jensen |
| 4,226,273 A | 10/1980 | Long |
| 4,235,270 A | 11/1980 | Kahaner |
| D291,428 S | 8/1987 | Shinomiya et al. |
| 4,784,201 A | 11/1988 | Palinkas |
| 4,818,034 A | 4/1989 | Djerf |
| 4,822,111 A * | 4/1989 | Albert ............ B60B 3/002 301/105.1 |
| 4,832,098 A | 5/1989 | Palinkas |
| 4,867,217 A | 9/1989 | Laurent |
| 4,917,162 A | 4/1990 | De Longcamp |
| 4,921,029 A | 5/1990 | Palinkas |
| 4,934,425 A | 6/1990 | Gajewski |
| 4,944,563 A | 7/1990 | Pinchbeck |
| 4,945,962 A | 8/1990 | Pajtas |
| 5,023,040 A | 6/1991 | Gajewski |
| 5,042,544 A | 8/1991 | Dehasse |
| D329,413 S | 9/1992 | Chandler |
| 5,174,634 A | 12/1992 | Blanck |
| 5,223,599 A | 6/1993 | Gajewski |
| 5,265,659 A | 11/1993 | Pajtas |
| 5,343,916 A | 9/1994 | Duddey |
| 5,375,640 A | 12/1994 | Harms |
| 5,390,985 A | 2/1995 | Chandler |
| D364,841 S | 12/1995 | Dangler |
| 5,782,540 A * | 7/1998 | Camfield ............ B60B 3/004 301/64.202 |
| D401,896 S | 12/1998 | Chandler et al. |
| D410,603 S | 6/1999 | Chandler et al. |
| 6,079,582 A | 6/2000 | Nickel |
| D434,463 S | 11/2000 | Lin |
| D434,464 S | 11/2000 | Lin |
| 6,167,931 B1 | 1/2001 | Hsiao |
| 6,340,210 B1 | 1/2002 | Handa |
| D466,962 S | 12/2002 | Chen |
| 6,533,007 B1 | 3/2003 | McMannis |
| D477,273 S | 7/2003 | Christenbury |
| D480,436 S | 10/2003 | Hong |
| 6,681,822 B2 | 1/2004 | Adams |
| 7,013,939 B2 | 3/2006 | Rhyne |
| D530,726 S | 10/2006 | Martin |
| 7,143,797 B2 | 12/2006 | Vannan |
| D536,298 S | 2/2007 | Wietham |
| 7,174,936 B2 | 2/2007 | Becker |
| 7,201,194 B2 | 4/2007 | Rhyne |
| 7,270,230 B2 | 9/2007 | Smith |
| 7,418,988 B2 | 9/2008 | Cron |
| 7,523,773 B2 | 4/2009 | Gabrys |
| D602,422 S | 10/2009 | Palinkas |
| D602,852 S | 10/2009 | Palinkas |
| 7,650,919 B2 | 1/2010 | Rhyne |
| D610,072 S | 2/2010 | Wallet |
| D612,799 S | 3/2010 | Wallet |
| 7,743,806 B2 | 6/2010 | Abe |
| 7,762,296 B2 | 7/2010 | Ganz |
| D627,715 S | 11/2010 | Harvey |
| D636,721 S | 4/2011 | Shimizu |
| 7,950,428 B2 | 5/2011 | Hanada |
| 8,056,593 B2 | 11/2011 | Palinkas |
| 8,061,398 B2 | 11/2011 | Palinkas |
| 8,104,524 B2 | 1/2012 | Manesh |
| 8,109,308 B2 | 2/2012 | Manesh |
| 8,113,253 B2 | 2/2012 | Arakawa |
| 8,176,957 B2 | 5/2012 | Manesh |
| 8,276,628 B2 | 10/2012 | Hanada |
| 8,308,814 B2 | 11/2012 | Sengun |
| 8,567,461 B2 | 10/2013 | Williams |
| 8,651,156 B2 | 2/2014 | Fadel |
| D711,815 S | 8/2014 | Abe |
| 8,826,953 B2 | 9/2014 | Pringiers |
| 8,915,234 B2 | 12/2014 | Gulke |
| D727,247 S | 4/2015 | Martin |
| 8,999,480 B2 | 4/2015 | Summers |
| D748,568 S | 2/2016 | Helin |
| 2005/0133133 A1 | 6/2005 | Becker |
| 2007/0029020 A1 | 2/2007 | Wietharn |
| 2007/0119531 A1 | 5/2007 | Steinke |
| 2007/0215259 A1 | 9/2007 | Burns |
| 2007/0240800 A1 | 10/2007 | Sauerwald |
| 2008/0314486 A1 | 12/2008 | Manesh |
| 2010/0132865 A1 | 6/2010 | Iwase |
| 2010/0141019 A1 | 6/2010 | Honiball |
| 2010/0200131 A1 | 8/2010 | Iwase |
| 2010/0307653 A1 | 12/2010 | Delfino |
| 2011/0024008 A1 | 2/2011 | Manesh |
| 2011/0079335 A1 | 4/2011 | Manesh |
| 2011/0126948 A1 | 6/2011 | Boyer |
| 2011/0168313 A1 | 7/2011 | Ma |
| 2011/0240189 A1 | 10/2011 | Dutton |
| 2011/0240193 A1 | 10/2011 | Matsuda |
| 2012/0060991 A1 | 3/2012 | Mun |
| 2012/0205017 A1 | 8/2012 | Endicott |
| 2012/0234444 A1 | 9/2012 | Palinkas |
| 2013/0233458 A1 | 9/2013 | Meraldi |
| 2013/0278044 A1 | 10/2013 | Dotson |
| 2013/0319591 A1 | 12/2013 | Van De Wiele |
| 2014/0000777 A1 | 1/2014 | Choi |
| 2014/0034219 A1 | 2/2014 | Chadwick |
| 2014/0062171 A1 | 3/2014 | Martin |
| 2014/0083581 A1 | 3/2014 | Schaedler |
| 2014/0191564 A1 | 7/2014 | Gebeau |
| 2014/0238561 A1 | 8/2014 | Choi |
| 2014/0326374 A1 | 11/2014 | Cron |
| 2014/0367007 A1 | 12/2014 | Thompson |
| 2015/0034222 A1 | 2/2015 | Martin |
| 2015/0202926 A1 | 7/2015 | Fredenburg |

FOREIGN PATENT DOCUMENTS

| | | | |
|---|---|---|---|
| EP | 0708713 | 5/1996 | |
| EP | 0802865 | 10/1997 | |
| EP | 2418098 | 2/2012 | |
| FR | 401528 | 9/1909 | |
| FR | 2616712 A1 * | 12/1988 | ............. B60B 25/00 |
| JP | 01311902 | 12/1989 | |

(56) References Cited

FOREIGN PATENT DOCUMENTS

| | | |
|---|---|---|
| JP | 01314602 | 12/1989 |
| JP | 2007137207 | 6/2007 |
| JP | 2008037262 | 2/2008 |
| JP | 2009269413 | 11/2009 |
| JP | 2013079037 | 5/2013 |
| KR | 20110031693 | 3/2011 |
| KR | 20120065690 | 6/2012 |
| KR | 20120070469 | 6/2012 |
| KR | 101430368 | 8/2014 |
| WO | 9718959 | 5/1997 |
| WO | 0183239 | 11/2001 |
| WO | 2007137858 | 12/2007 |
| WO | 2008050503 | 5/2008 |
| WO | 2012160534 | 11/2012 |
| WO | 2014148824 | 9/2014 |

OTHER PUBLICATIONS

Office Action dated Oct. 13, 2016 for Design U.S. Appl. No. 29/539,200.
Office Action dated Oct. 13, 2016 for Design U.S. Appl. No. 29/546,275.
Office Action dated Oct. 13, 2016 for Design U.S. Appl. No. 29/546,279.
Office Action dated Oct. 13, 2016 for Design U.S. Appl. No. 29/546,281.
Notice of Allowance dated Oct. 18, 2016 for Design U.S. Appl. No. 29/546,285.
Bothe, A.M., "Designed by Nature", Diesel Progress, North American Edition, pp. 44-45, Dec. 2008.
Michelin, "How the Michelin X Tweel Airless Radial Tire Works", http://www.michelintweel.com/aboutTweel.html, 3 pages, Michelin 2012-2014.
Reilly, M.B. et al., "Student's Tire Design is on a Roll, Ranks in Top 100 of More than 11,000 International Contest Entries", University of Cincinnati, 3 pages, Jun. 26, 2013.
Polaris Defense, Terrainarmor Non-Pneumatic Tires, Polaris Industries, Inc., 2 pages, 2013.
Yokohama's Airless Concept Tire—A Non-Pneumatic Secret?, http://www.airless-tire.com/yokohama-airless-concept-tire/ 2 pages, Oct. 28, 2012.
Vijayenthiran, V., "Hankook is the Latest to Roll out Airless Tire Concept", MotorAuthority.com, 3 pages, Sep. 9, 2013.
"Airless Tires", http://www.bridgestonetire.com/tread-and-tread/tire-talk-airless-concept-tires, 2 pages, Sep. 5, 2014.
Shankland, S., "Out with the Air: Bridgestone Shows off Tires You Never have to Inflate", CNET Magazine,http://www.cnet.com/news/out-with-the-air-bridgestone-shows-off-non-pneumatic-tires/, 2 pages, Oct. 3, 2014.
"BriTek's Brilliant Airless Bicycle Tire Reinvents the Wheel", http://inhabitat.com/britek-reinvents-the-wheel-creates-airless-bicycle-tires/, 2 pages, May 5, 2015.

\* cited by examiner

WHEEL ASSEMBLIES WITH NON-PNEUMATIC TIRES

This application claims the benefit of U.S. Provisional Application No. 62/108,112, filed Jan. 27, 2015 and U.S. Non-Provisional application Ser. No. 14/729,495, filed Jun. 3, 2015, the entire disclosures of which are hereby incorporated herein by reference.

BACKGROUND

1. Field of the Disclosure

The present application is directed to a non-pneumatic tire and a wheel assembly using a non-pneumatic tire, and more particularly, to a non-pneumatic tire for outdoor power equipment.

2. Description of Related Art

Many outdoor power equipment devices are provided with pneumatic, or air-filled, tires made of an airtight inner core filled with pressurized gas. A tread, usually reinforced with steel belting or other materials, covers this inner core and provides an area which contacts the traction surface. At times, these tires are damaged or otherwise caused to be deflated during shipment. At other times, these tires may lose pressure after remaining in a single location for extended periods, such as a snow thrower stored in a shed during summer months. This loss of pressure requires correction or replacement by the equipment user or by a member of the equipment supply chain. This can lead to costly warranty issues.

Furthermore, many power equipment users do not set and maintain proper tire pressure. This may result in improper machine orientation and/or spatial attitude, thereby creating situations which could result in loss of control or stability of the power equipment device. Additionally, many pneumatic tires are designed to have good traction in an axial direction as well as the fore/aft directions. Accordingly, improvements to power equipment tires and wheel assemblies are desired.

SUMMARY

The following presents a simplified summary in order to provide a basic understanding of some example aspects of the disclosure. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

According to one aspect, the subject application involves a non-pneumatic tire assembly including a non-pneumatic tire. The non-pneumatic tire includes an inner circumferential ring and an outer circumferential ring defining an annular space between the circumferential rings. The inner circumferential ring also defines a cylindrical space inside the inner circumferential ring. The non-pneumatic tire also includes a plurality of partitions within the annular space. The partitions connect the circumferential rings. The non-pneumatic tire further includes a ground-contacting tread located on the outer circumferential ring. The non-pneumatic tire assembly also includes a rim. The rim includes a plurality of pieces, and the rim is located within the cylindrical space. The non-pneumatic tire assembly further includes a hub. The hub is removably connected to the rim.

According to another aspect, the subject application involves a non-pneumatic tire. The non-pneumatic tire includes an inner circumferential ring and an outer circumferential ring defining an annular space between the circumferential rings. The inner circumferential ring also defines a cylindrical space inside the inner circumferential ring. The non-pneumatic tire also includes a plurality of partitions within the annular space. The partitions connect the circumferential rings. The non-pneumatic tire further includes a ground-contacting tread located on the outer circumferential ring.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

DETAILED DESCRIPTION

Figure 1:
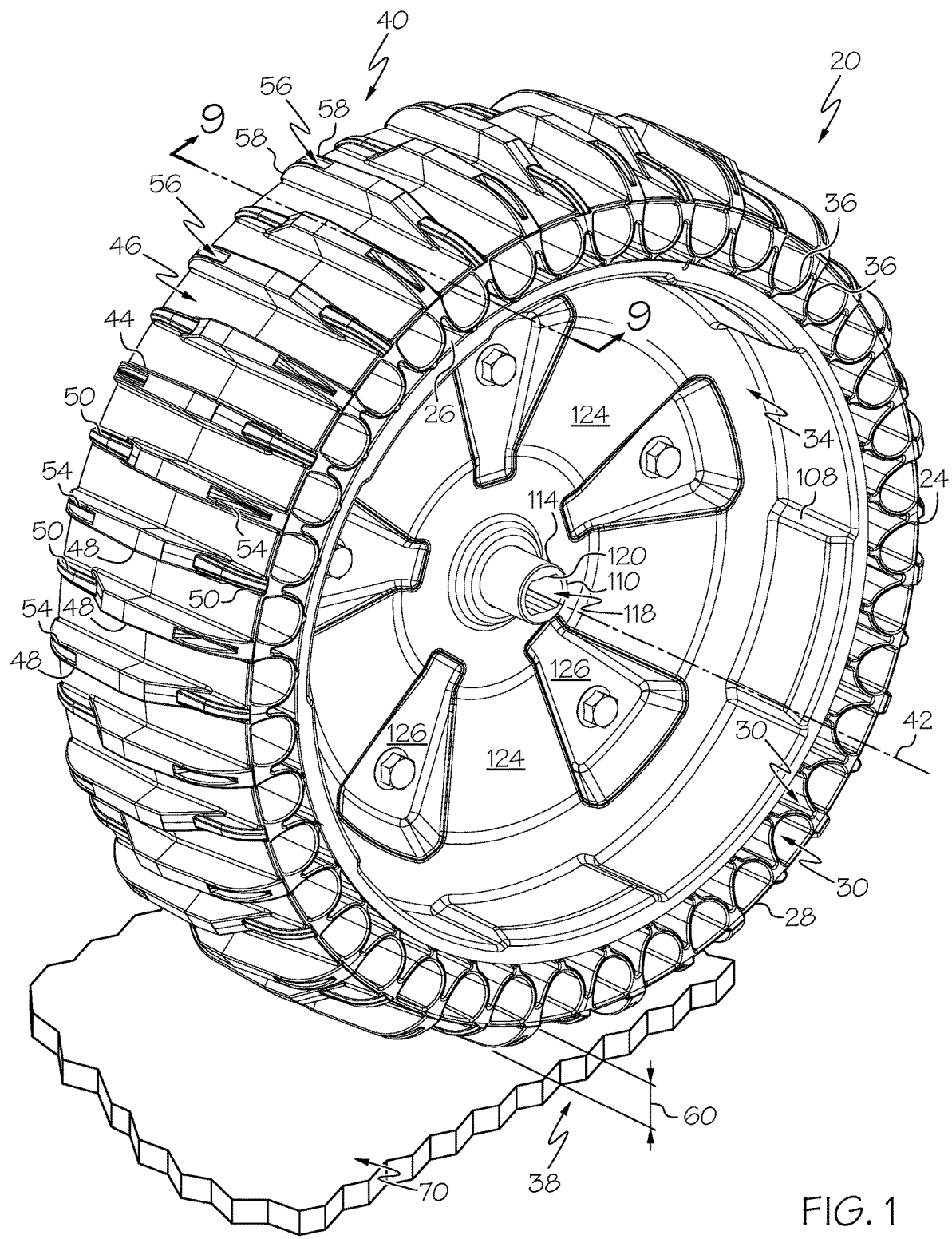
FIG. 1 is a perspective view of a non-pneumatic tire assembly according to an aspect of the present disclosure.

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

The described apparatus provides for a non-pneumatic tire and wheel configuration, herein called "non-pneumatic tire," which can improve certain traction aspects while reducing the need for conventional service and maintenance. The non-pneumatic tire may be attached to both pedestrian or "walk-behind" and "riding" outdoor power equipment, including, but not limited to, walk-behind mowers and snow throwers, riding mowers and snow blowers, lawn and garden tractors, and utility vehicles. However, the remainder of the disclosure will describe the non-pneumatic tire assembly as used on a snow thrower.

Turning to FIG. 1, a perspective view of an exemplary embodiment of a non-pneumatic tire assembly 20 includes a non-pneumatic tire 24. The non-pneumatic tire includes an inner circumferential ring 26 and an outer circumferential ring 28. Together, the inner circumferential ring 26 and the outer circumferential ring 28 define an annular space 30 between the circumferential rings 26, 28 and a cylindrical space 34 inside the inner circumferential ring 26. The non-pneumatic tire also includes a plurality of partitions 36 within the annular space 30, extending between and connecting the two circumferential rings 26, 28. The geometry of the partitions 36 can vary, as will be described below, however, regardless of the geometry, the partitions 36 are designed to support the weight of the outdoor power equipment and transfer that weight to a riding surface (e.g., ice, snow, earth, pavement, etc.) Additionally, the design of the partitions 36 enables the partitions 36 to resist permanent (plastic) deformation while enabling some amount of temporary (elastic) deformation as the non-pneumatic tire assembly 20 rolls and supports the weight of the outdoor power equipment. In one example, the partitions 36 are non-radial, meaning that the partitions 36 are not straight-line segments that lie on any radius of the non-pneumatic tire 24.

Figure 2:
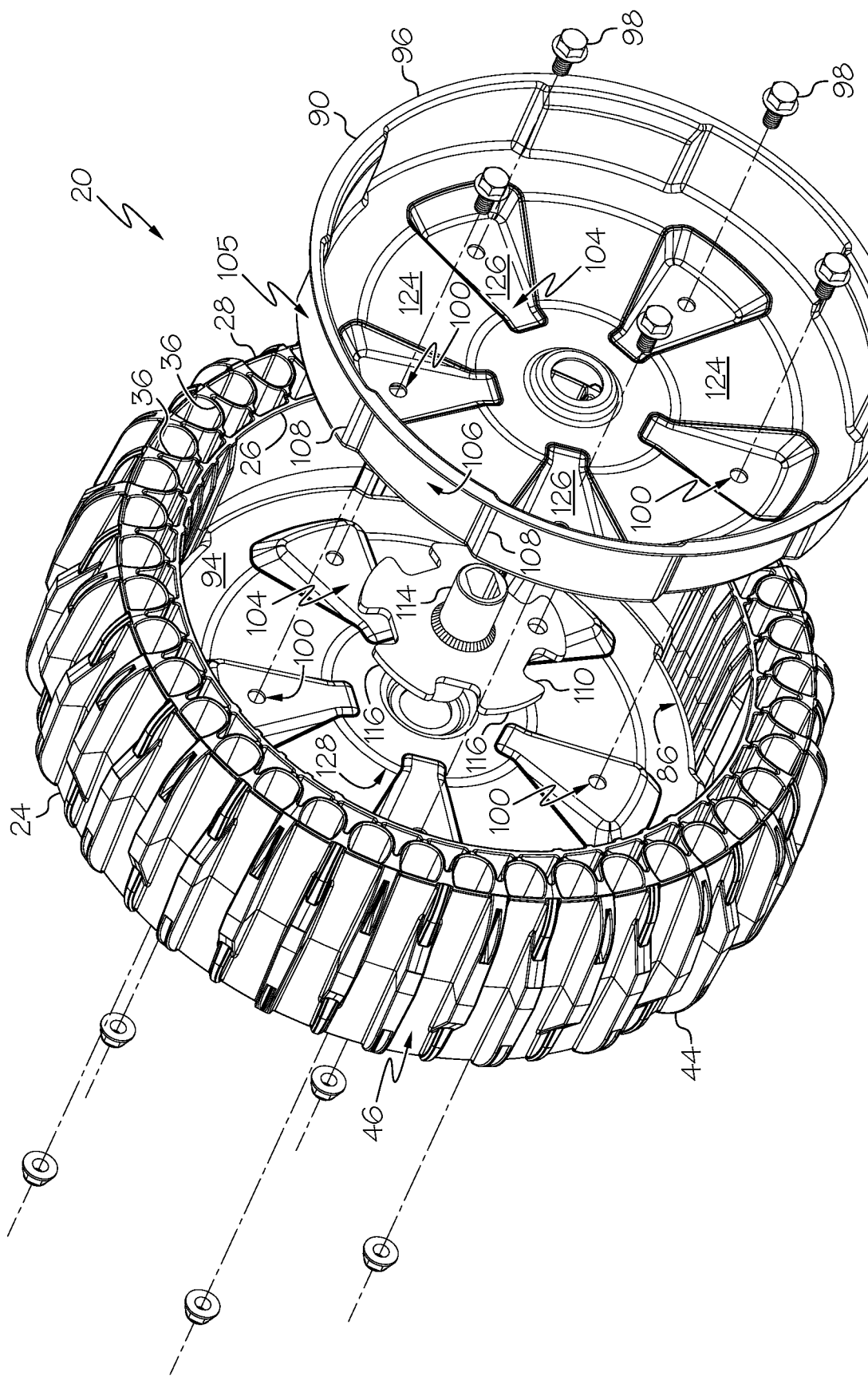
FIG. 2 is an exploded view of the non-pneumatic tire assembly of FIG. 1.
Figure 4:
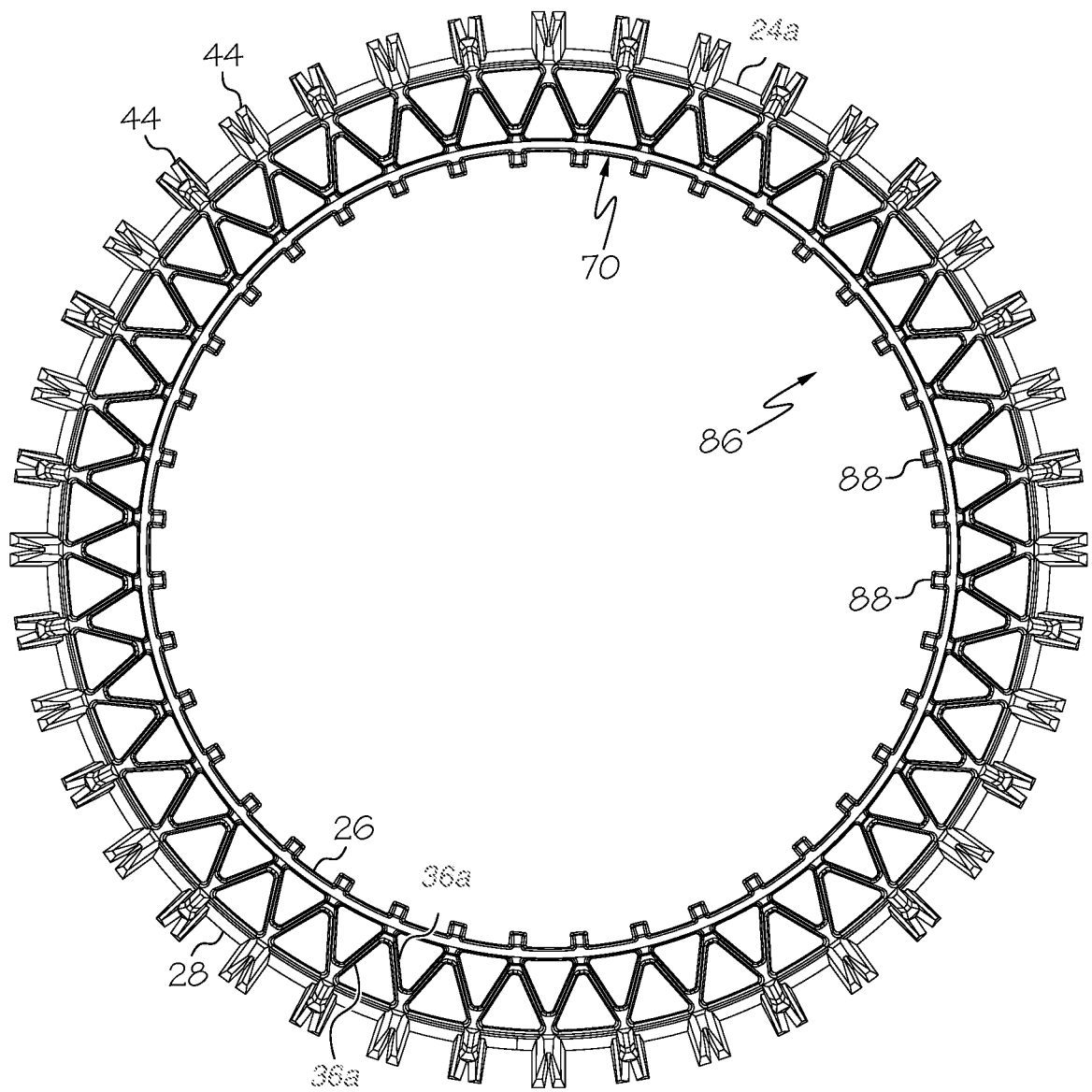
FIG. 4 is similar to FIG. 3, having partitions connected to the outer circumferential ring directly opposite the tire tread ridges.
Figure 5:
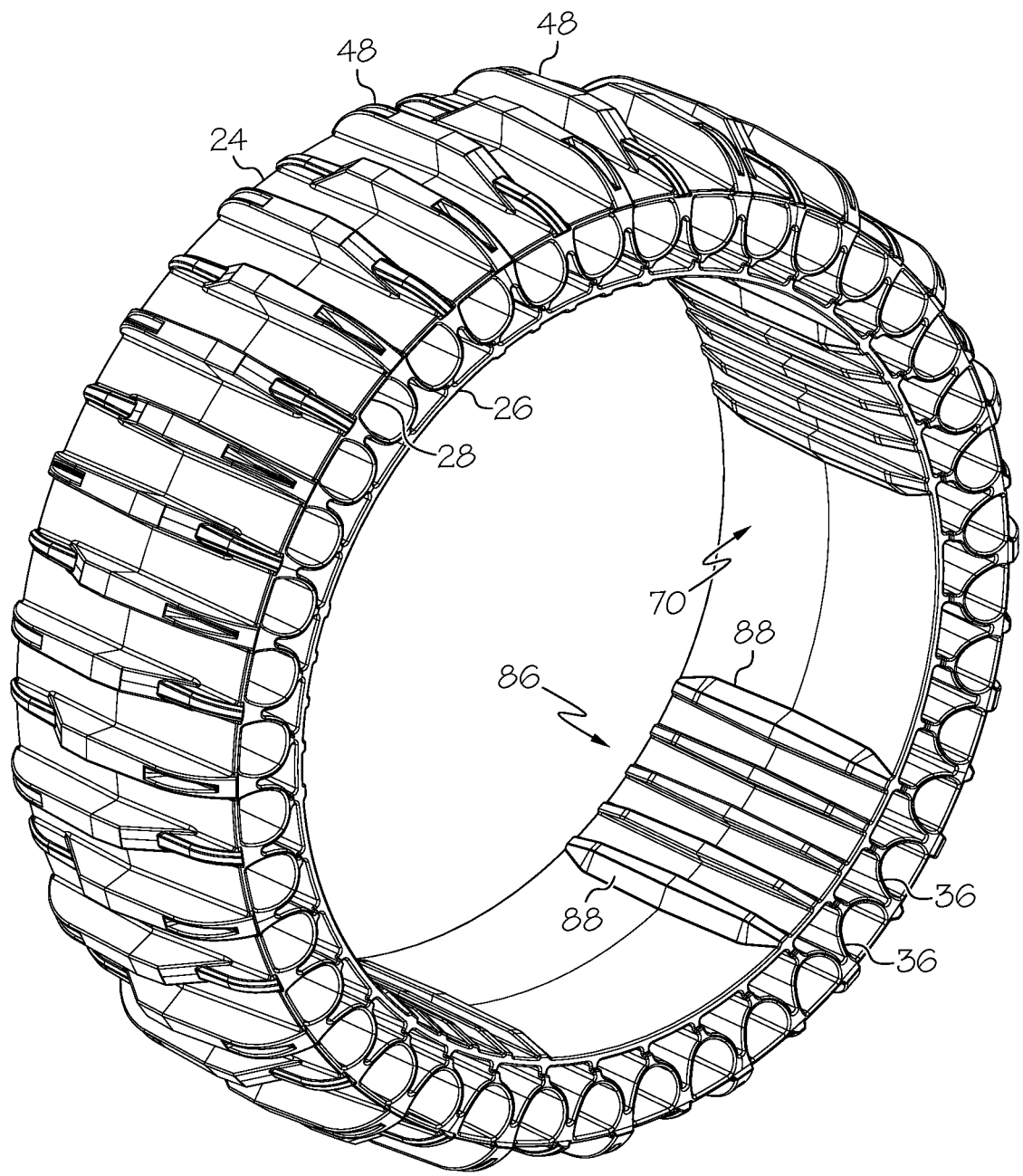
FIG. 5 is a perspective view of a non-pneumatic tire having wishbone-shaped partitions.
Figure 6:
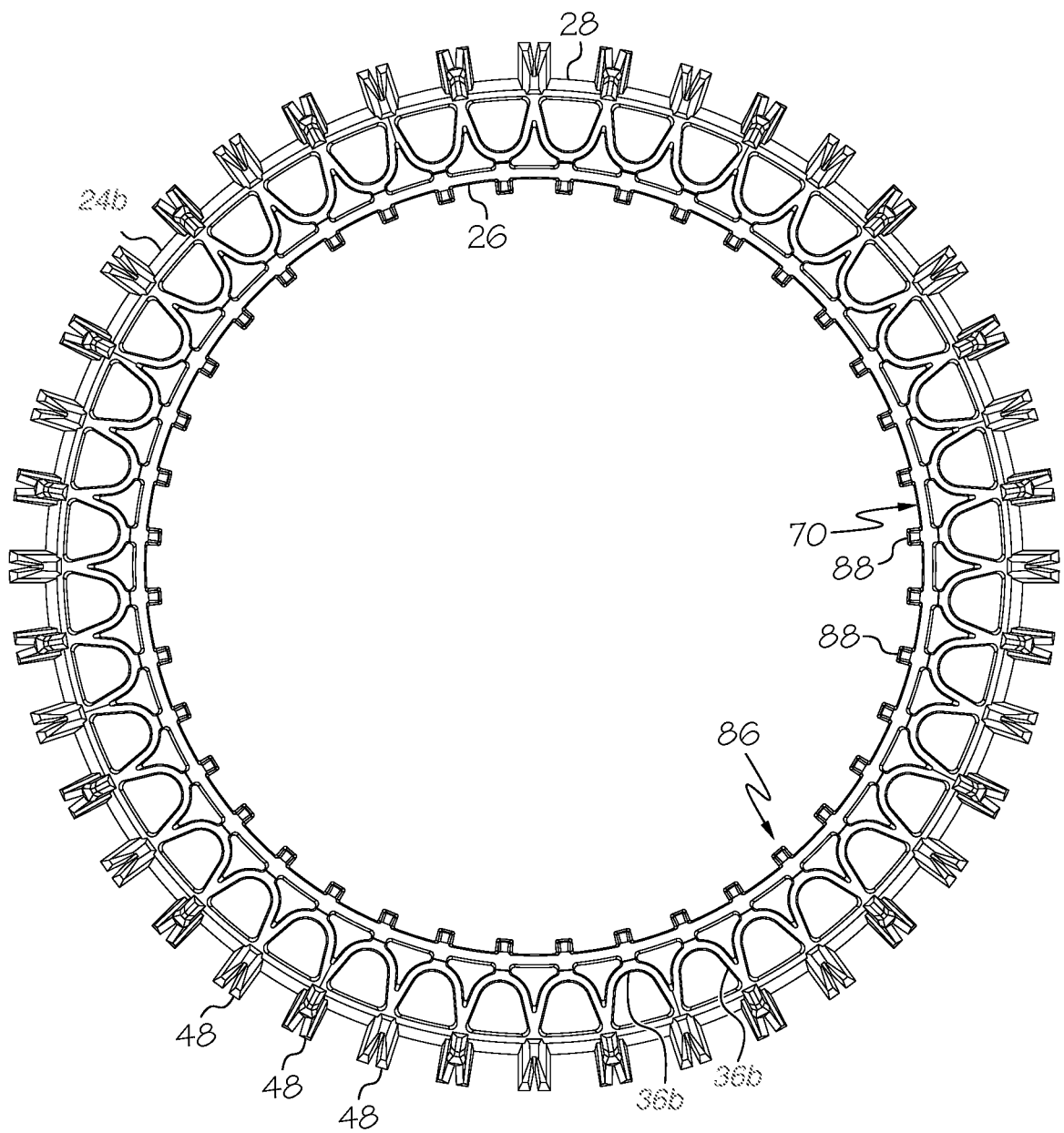
FIG. 6 is an elevation view of a non-pneumatic tire having "U-shaped" partitions.
Figure 7:
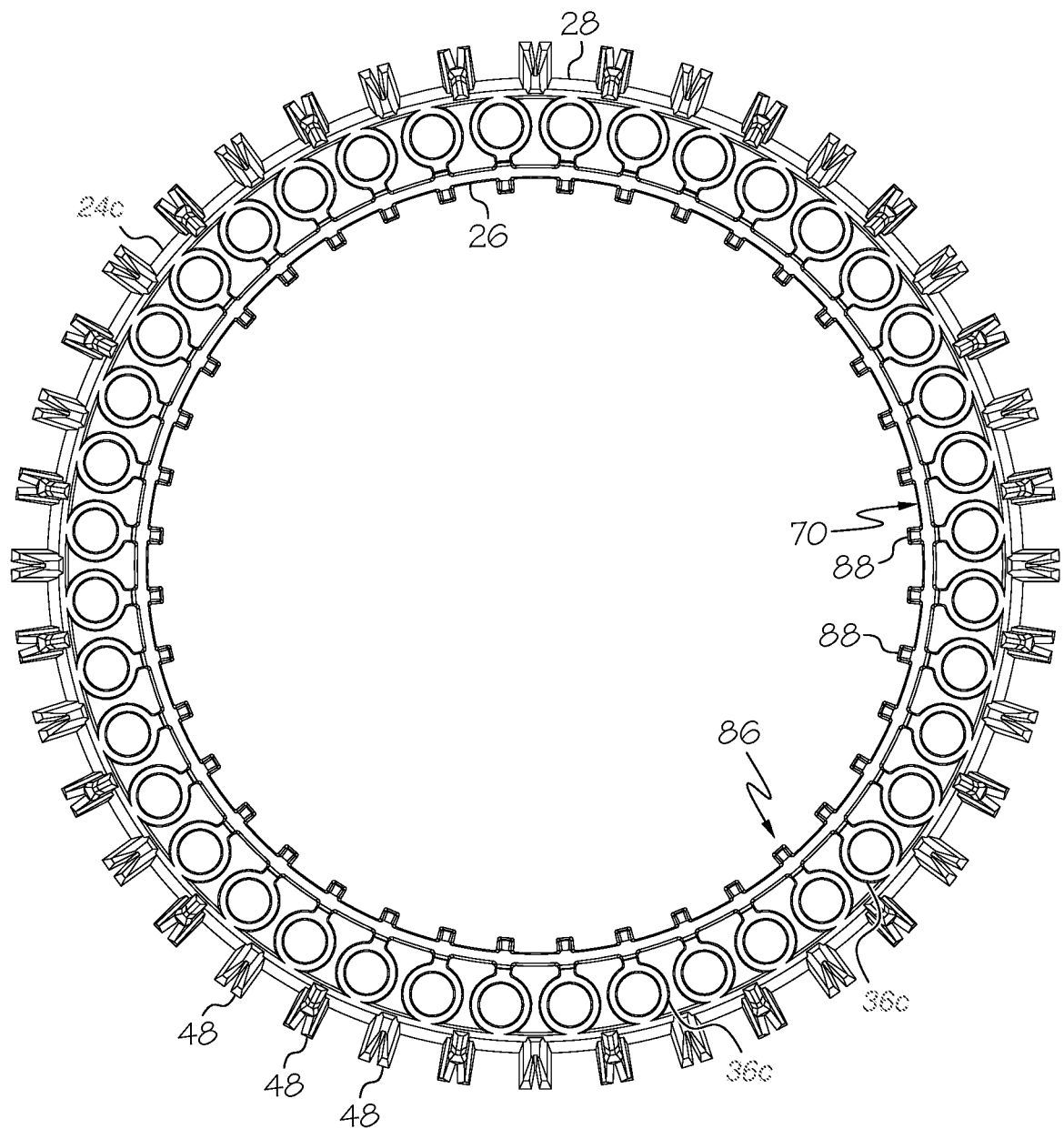
FIG. 7 is an elevation view of a non-pneumatic tire having "O-shaped" partitions.
Figure 8:
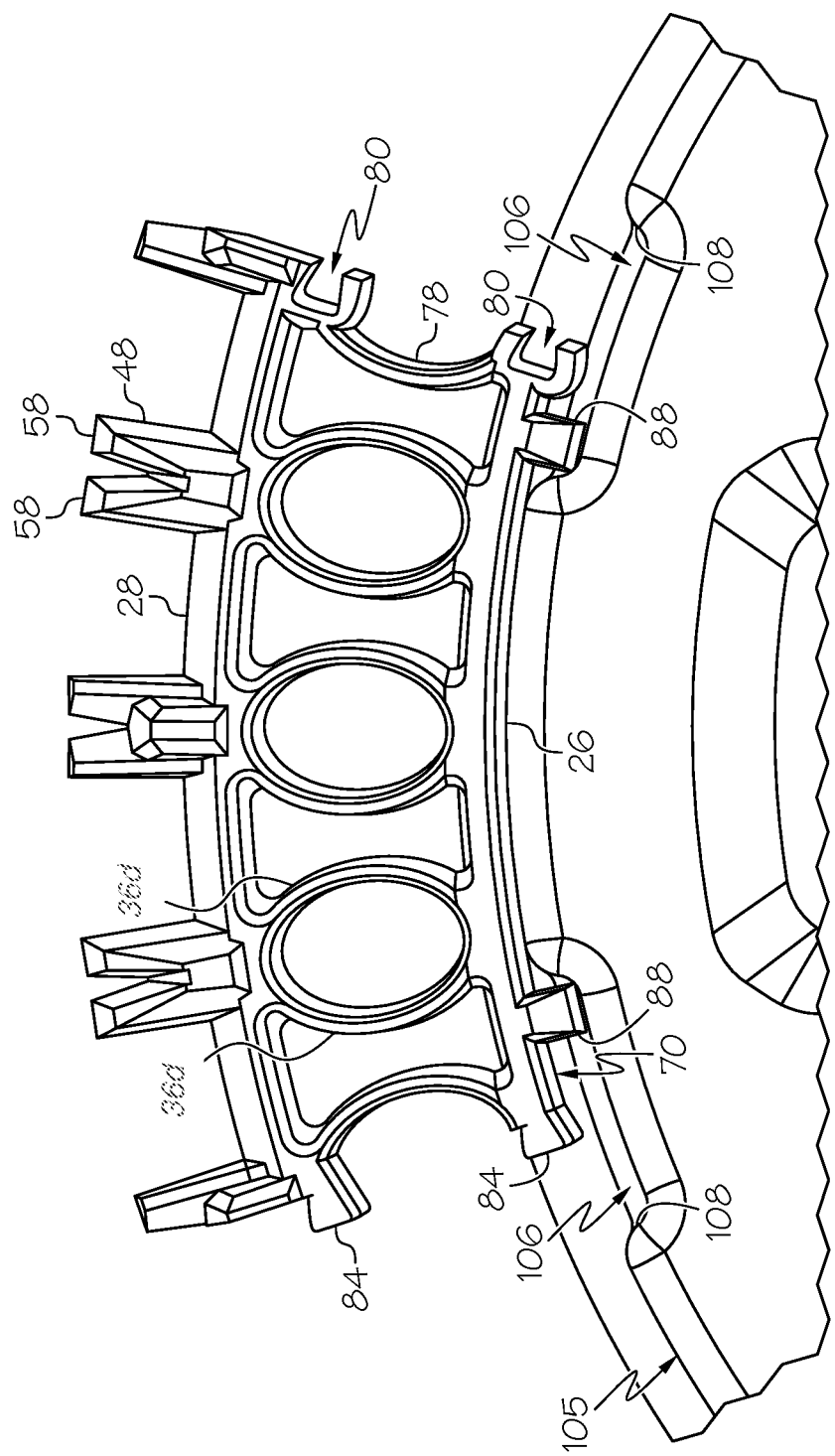
FIG. 8 is a partial elevation view of a non-pneumatic tire section having oval-shaped partitions.

The partitions 36 can include any number of suitable generalized shapes from the vantage point of an out-board side 38 or an in-board side 40 of the non-pneumatic tire 24 in a direction parallel to the axis 42 of the non-pneumatic tire assembly 20. The generalized shape of the partitions 36 can remain constant through the axial width of the non-pneumatic tire 24. As shown in FIGS. 1, 2, and 5, the partitions 36 can have a generalized shape of a wishbone. The non-pneumatic tire 24a of FIGS. 3 and 4 includes partitions 36a having a generalized shape of a "V." FIG. 6 shows the partitions 36b having a U-shape in non-pneumatic tire 24b, while FIG. 7 shows the partitions 36c in an "O" or a circle shape in non-pneumatic tire 24c. FIG. 8 shows the partitions 36d having a generalized shape of an oval. Of course, the partitions 36, 36a, 36b, 36c, and 36d can include these generalized shapes and/or combinations of these shapes in patterns that can repeat around the annular space 30. In other examples, the partitions 36 can have an ogive or hypocycloid shape that repeats around the annular space 30.

The non-pneumatic tire 24 further includes a ground-contacting tread 44 located on the outer circumferential ring 28. The ground-contacting tread 44 is located on an exterior side 46 of the outer circumferential ring 28. In one example, the ground-contacting tread 44 can include a plurality of ridges 48 extending axially across the exterior side 46 of the outer circumferential ring 28. The ridges 48 can include a single ridge portion 50 on one axial side of the outer circumferential ring 28 and a split ridge portion 54 on the other axial side of the outer circumferential ring 28. The split ridge portion 54 can define a slot 56 between the two peaks 58 of the split ridge portion 54.

Figure 9:
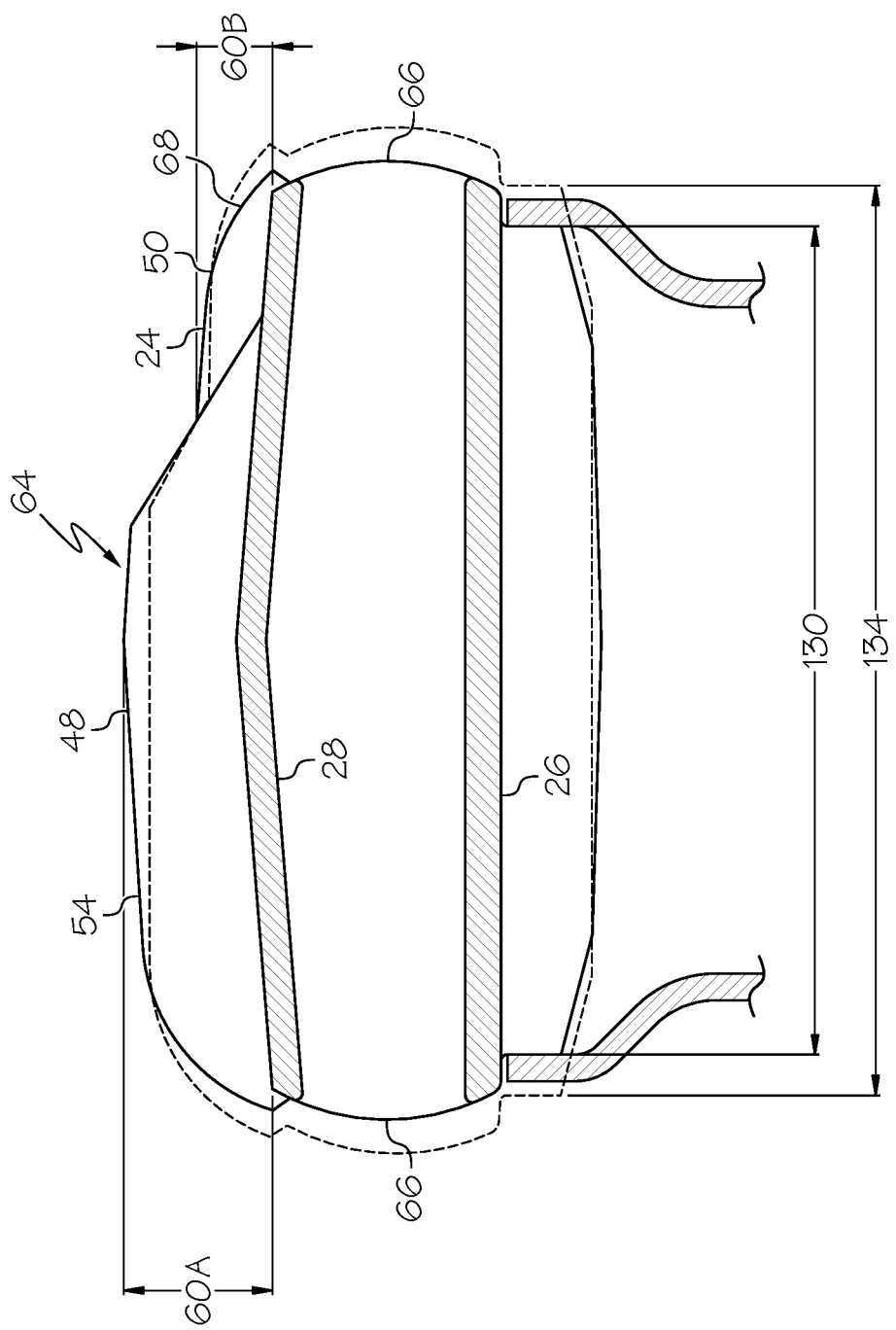
FIG. 9 is a cross-section view of the non-pneumatic tire assembly taken along line 9-9 of FIG. 1.

In one example, the described ridge 48 including the single ridge portion 50 and the split ridge portion 54 can extend to any suitable radial distance 60 from the outer circumferential ring 28. This distance 60 can vary along the axial width of the non-pneumatic tire 24. For example, as shown in FIG. 9, the ridges 48 can include a radial distance 60A such that the center of the ridge 48 along the axial width is greater than the radial distance 60B at the ends of the ridge 48. This arrangement of a varied radial distance 60 creates a peaked elevation 64 away from the outer circumferential ring 28. This peaked elevation 64 and the single ridge portion 50 and split ridge portion 54 can develop higher fore-aft traction in the non-pneumatic tire 24 while reducing the sideways (axial) traction of the non-pneumatic tire 24. This can ease the operation of sliding outdoor power equipment (e.g., a snow thrower) sideways and/or turning the snow thrower. In one example, the peaked elevation 64 is located at about the axial center point of the plurality of ridges 48.

Returning to FIG. 1, adjacent ridges 48 can alternate orientation such that the split ridge portion 54 of a single ridge 48 is located on the in-board side 40 of the non-pneumatic tire 24 while the split ridge portion 54 of the adjacent ridge 48 in either direction around the outer circumferential ring 28 is located on the out-board side 38 of the non-pneumatic tire 24. This alternating arrangement of ridges 48 can enable the non-pneumatic tire 24 (and the non-pneumatic tire assembly 20) to be "omni-directional," meaning that the non-pneumatic tire 24 has equal traction in the fore and aft operating directions. Moreover, the non-pneumatic tire 24 can be mounted to the remainder of the non-pneumatic tire assembly 20 whether the in-board side 40 is facing toward the outdoor power equipment or away from the outdoor power equipment. This omni-directional feature can ease assembly and maintenance of the outdoor power equipment. The described ridge orientation also enables the non-pneumatic tire 24 to be molded in a simple mold or die that does not require any "action" or moving parts in the die. In other words, the non-pneumatic tire 24 is molded in a relatively simple, axial motion die.

Additionally, each ridge 48 includes a height dimension and a width dimension. These dimensions can be calculated, constructed, and tested to resist deformation under particular circumstances such as supporting the weight of the outdoor power equipment for extended periods of time while in a single position. In an even more particular circumstance, the ridges 48 can resist deformation while supporting the weight of the outdoor power equipment for extended periods of time in a single position at increased temperature, such as shed storage during a summer season. In one example, the aspect ratio of each ridge 48 is between about 1:1 to about 2:1. More particularly, the aspect ratio of each ridge 48 is between about a value slightly larger than 1:1 to no larger than 2:1. Additionally, it is to be understood that the tread can take any suitable shape or form. The shown examples of the ridges are but one example, and are not meant to be limiting.

Figure 3:
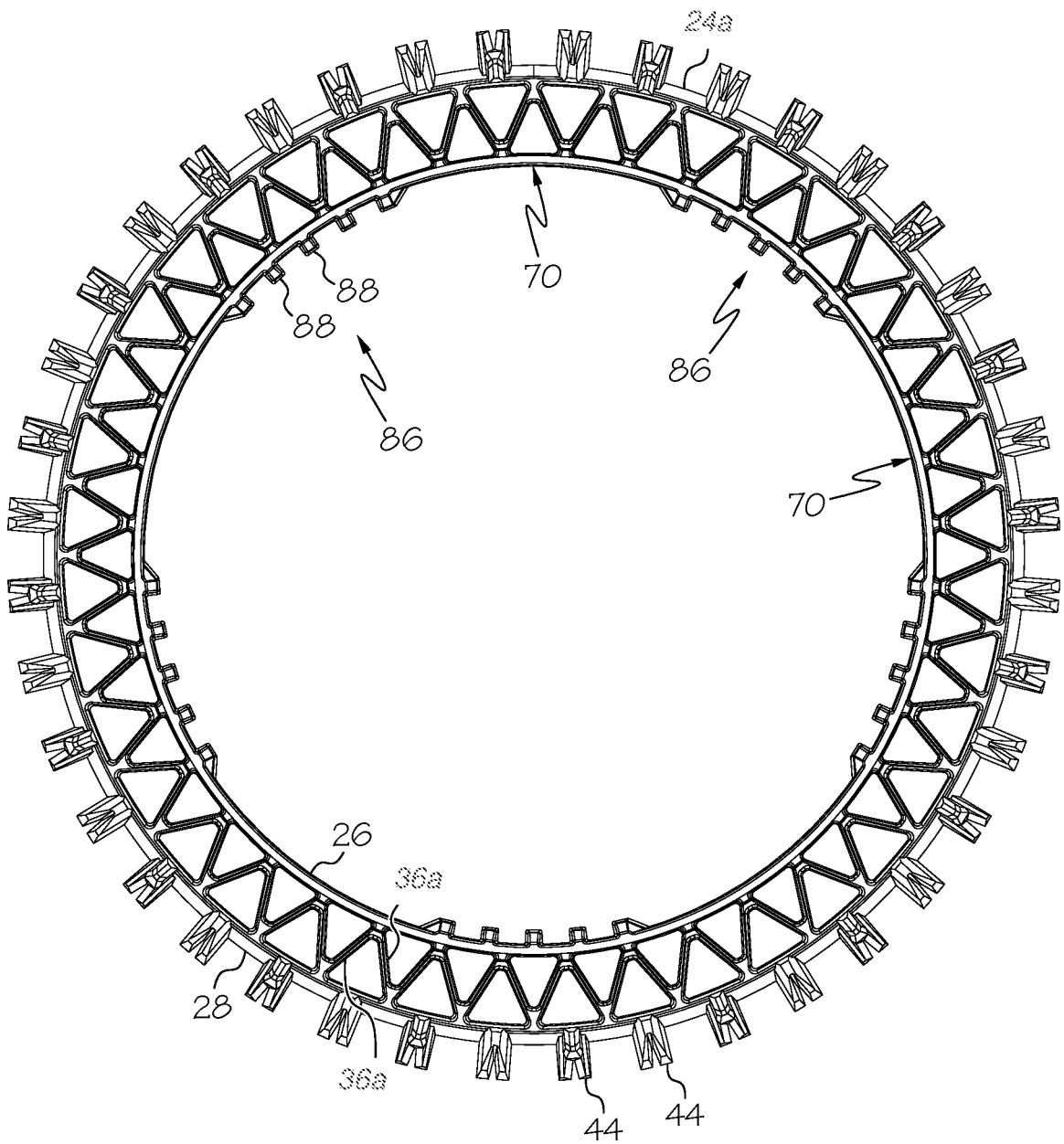
FIG. 3 is an elevation side view of a non-pneumatic tire showing "V-shaped" partitions connected to an outer circumferential ring between tire tread ridges.

It is to be appreciated that the location of the partitions 36, regardless of their generalized shape(s), can be located at various positions relative to the ridges 48. For example, FIG. 3 shows the "V" shaped partitions 36a connecting with the outer circumferential ring 28 at approximately a midpoint between each ridge 48 on non-pneumatic tire 24a. Alternatively, the partitions 36a can be shifted circumferentially such that they connect with the outer circumferential ring 28 at positions directly opposite the ridges 48, as shown in FIG. 4. These locations can be calculated and selected to develop preferential load bearing and/or deflection characteristics in the non-pneumatic tire 24a and the tires shown in all of the FIGS. Additionally, the ridges 48 can be spaced at any selected interval to develop preferential deflection and/or traction characteristics. In one particular example, the ridges 48 are spaced approximately one-inch apart on the circumference of the outer circumferential ring 28.

Returning to FIG. 9, the partitions 36 can define arcuate sides 66 on a sidewall area that extend in an axial direction relative to the edges of the inner circumferential ring 26 and the outer circumferential ring 28. These arcuate sides 66 can act as built-in wear surfaces and/or bumpers for a snow thrower. For example, as an operator guides the snow thrower along a path having a border such as a curb, the arcuate sides 66 can contact the curb prior to other portions of the snow thrower. The operator can then "drive by feel" by keeping the arcuate sides 66 in contact with the curb or other physical structure. Additionally, the arcuate sides 66 can prevent contact wear and/or damage to other portions of the non-pneumatic tire assembly 20 (e.g., the rim) and the snow thrower. In one example, the arcuate sides 66 can include a curve 68 that extends to the ridges 48 of the ground-contacting tread 44.

The non-pneumatic tire 24 can be constructed of any suitable material. In one example, the non-pneumatic tire 24 is formed from a plastic containing a rubber filler material. In another example, the non-pneumatic tire 24 is formed from a thermoset polymer. Additionally, the non-pneumatic tire 24 material can be selected to optimize tire performance. For example, the material can achieve a balance between traits of solidity to promote tire strength and resistance to permanent deformation during relatively hot long-term storage (e.g., a snow thrower in a shed during summer months), and traits of flexibility to promote tire traction and an ability to shed snow collected in the ground-contacting tread 44 as it rolls along a snow-covered surface 70.

Figure 10:
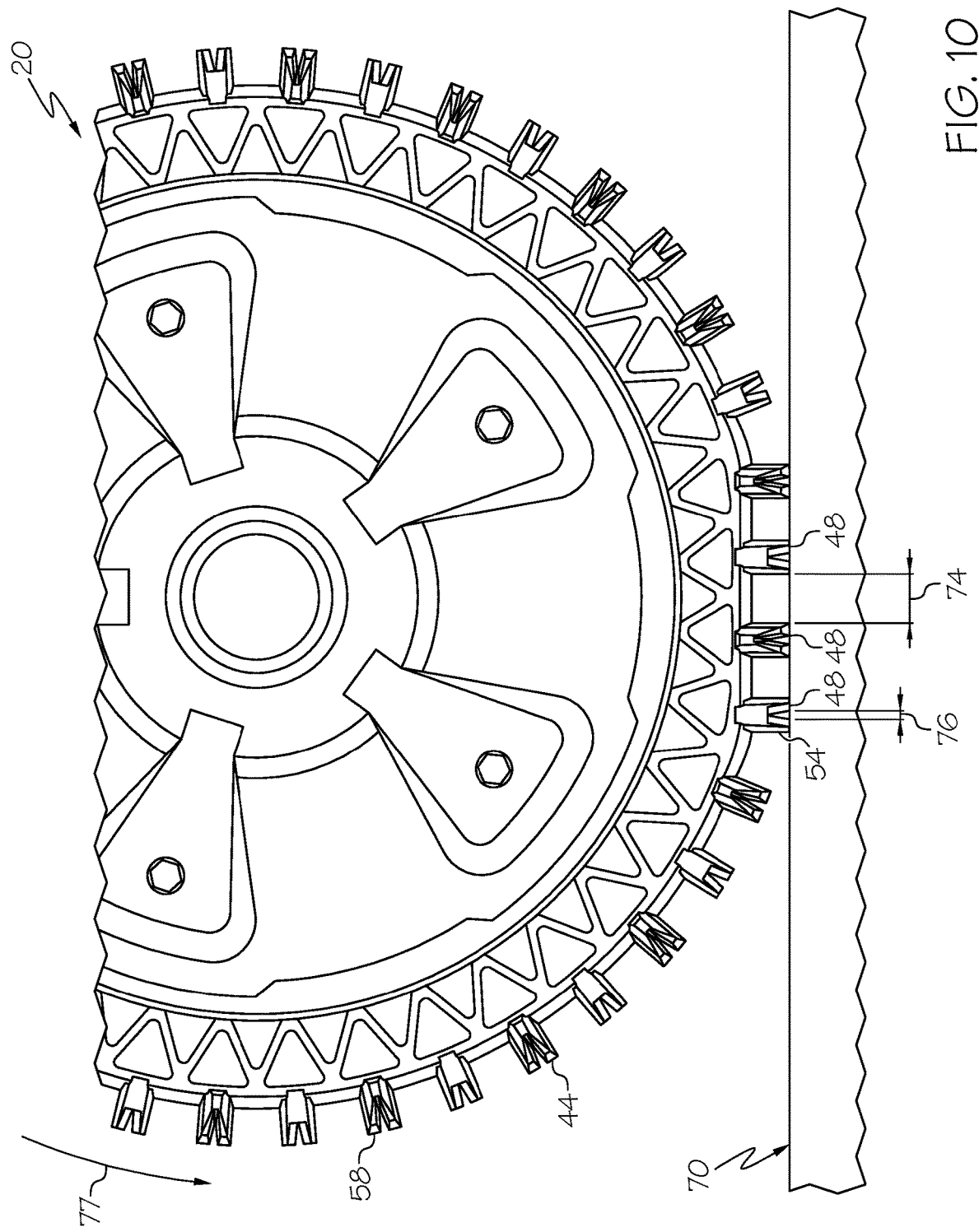
FIG. 10 is an elevation view of a non-pneumatic tire assembly showing elastic deformation while placed on a snow-covered surface.

For example, turning to FIG. 10, the ground-contacting tread 44 of the non-pneumatic tire 24 contacts the snow/ice covered surface 70 (e.g., driveway, sidewalk, etc.). The weight of the snow thrower causes elastic deformation of the non-pneumatic tire 24 such that a plurality of ridges 48 contact the snow/ice covered surface 70 at any given time. This deformation causes the individual ridges 48 to deform toward one another and decrease the distance 74 between the ridges 48. This can trap snow, ice, and other objects between the ridges 48 of the ground-contacting tread 44. The same is true for the distance 76 between the two peaks 58 of the split ridge portion 54. However, as the non-pneumatic tire assembly 20 continues to roll along the surface 70 in the direction of arrow 77, a portion of the non-pneumatic tire 24 leaves contact with the surface 70. As the ground-contacting tread 44 leaves the surface, it is no longer bearing the weight of the snow thrower, and reverts back to its original formation; increasing the distances between individual ridges 48 and the two peaks 58 of the split ridge portion 54. This reversion tends to urge collected material (e.g., snow, ice, etc.) out and away from the spaces between the individual ridges 48 and the two peaks 58. Removal of collected material can enable improved traction for the non-pneumatic tire assembly 20 when compared to other tire assemblies that do not automatically remove collected material from the tread.

In one example, the non-pneumatic tire 24 can be formed in a single, unitary piece as shown in FIGS. 1-7. In another example, the non-pneumatic tire 24 can comprise a plurality of generally arcuate sections 78 as shown in FIG. 8. A number of such sections 78 can be assembled to form a complete, cylindrical non-pneumatic tire 24. In this example, each arcuate section 78 can include a slot 80 at one end and a tab 84 at the other end. The tabs 84 and slots 80 of adjacent arcuate sections 78 can be urged into mating arrangement to form a cylindrical non-pneumatic tire 24.

Whether formed of a single, unitary body or from several arcuate sections 78, the non-pneumatic tire 24 can be injection molded. In either case, the selected geometry of the non-pneumatic tire 24 can be configured such that the tooling used to create the non-pneumatic tire 24 does not include any slides or "action" as previously noted.

As shown in FIGS. 2-8, the non-pneumatic tire 24 can define a textured profile 86 on an interior surface 70. The textured profile 86 can include any suitable structure to enable transmission of rotational force from a power supply, through any intermediate structure, to the non-pneumatic tire 24 such that rotational motion developed at the power supply can urge rotational motion of the non-pneumatic tire 24. In the shown examples, the textured profile 86 consists of axial ridges 88 on an interior surface 70 of the inner circumferential ring 26. It is to be appreciated that various intermediate structures may be included between the power supply and the non-pneumatic tire 24, including, but not limited to: axles, transmissions, etc.

Figure 11:
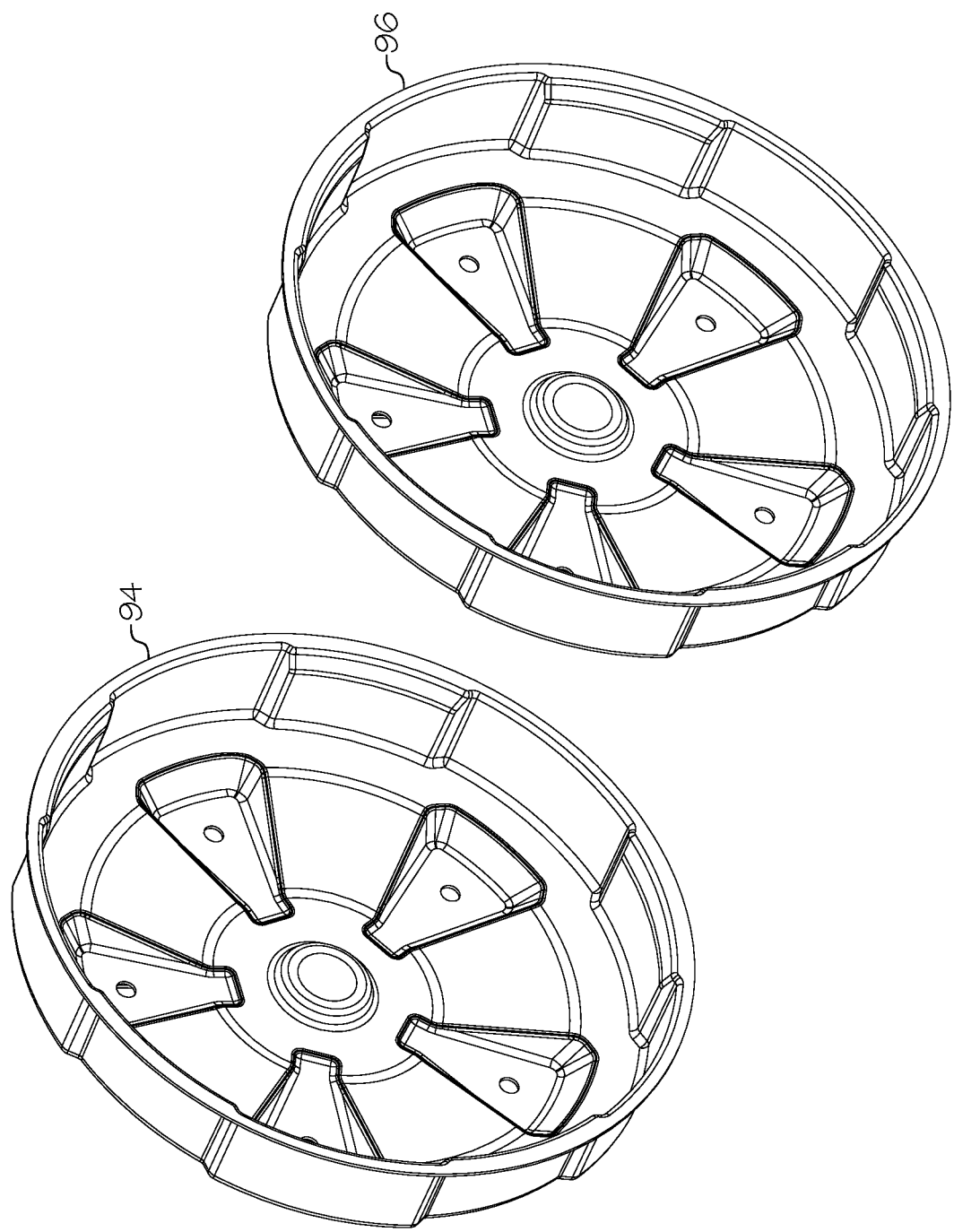
FIG. 11 is a perspective view of an in-board rim half and an out-board rim half that are two identical halves.

Returning to FIG. 2, the non-pneumatic tire assembly 20 also includes a rim 90. The rim 90 includes a plurality of pieces. In the shown examples, the rim 90 includes an in-board rim half 94 and an out-board rim half 96, however, this example is not meant to be limiting. However many pieces there are, the rim 90 is located within the cylindrical space 34 inside the inner circumferential ring 26. As shown in FIG. 11, the in-board rim half 94 and the out-board rim half 96 can be identical to one another, or two identical halves. This feature can save engineering time and tooling costs. This feature can also enable the non-pneumatic tire assembly 20 to be used on either side of a snow thrower or any other vehicle.

The in-board rim half 94 and the out-board rim half 96 can be fastened together by any suitable means to form a complete rim 90. In one example, the in-board rim half 94 and the out-board rim half 96 are separably attached using fasteners 98. The fasteners 98 can pass through apertures 100 defined in the in-board rim half 94 and the out-board rim half 96. Of course, the apertures 100 in the in-board rim half 94 can be aligned with the apertures 100 of the out-board rim half 96. In one example, the apertures 100 can be defined in a portion of the rim half 94, 96 that is a vertical plane 104. In this example, the vertical plane 104 from the in-board rim half 94 can be aligned with and even be in contact with the vertical plane 104 of the out-board rim half 96. Contact between the vertical planes 104 can enhance the strength of the fastened connection between the rim halves 94, 96 and minimize any deformation of either rim half 94, 96 as they are fastened together.

As shown in FIG. 2, the rim 90 can include a circumferential surface 105 on its exterior. The circumferential surface 105 can include structure configured to cooperate with and/or interact with structure on the interior surface 70 of the non-pneumatic tire 24. As previously described, the structure on the interior surface 70 can include the textured profile 86, such as the axial ridges 88 located on the inner circumferential ring 26. In one example, the rim 90 defines a cavity 106 on the circumferential surface 105 that is configured to slide over the axial ridges 88 as the in-board rim half 94 and the out-board rim half 96 are assembled to form the complete rim 90.

This arrangement provides a physical interference between cavity side walls 108 and the axial ridges 88 to enable transfer of rotational motion from the rim 90 to the non-pneumatic tire 24. As such, the rotational force provided by the power supply rotates the rim 90, and the rotational force is then transferred through the physical interference to rotate the non-pneumatic tire 24. Physical interference between the cavity side walls 108 and the axial ridges 88 can prevent relative rotational motion between the rim 90 and the non-pneumatic tire 24. It is to be understood that the geometries and locations of the axial ridges 88 and the cavities 106 can be designed and manufactured to adequately transfer rotational power for any number of anticipated workloads, torques, environmental conditions, etc.

As shown in FIGS. 1-3, 5, and 8, the axial ridges 88 and the cavities 106 can be located in sections around the interior surface 70 separated by distances having no cavities or axial ridges. As shown in FIGS. 4 and 6-7, the axial ridges 88 can be located at regular intervals continuously around the interior surface 70. In this instance, the cavities 106 can be designed accordingly for proper interaction and/or cooperation with the axial ridges 88. Furthermore, these examples are not meant to be limiting, and any suitable arrangement of axial ridges 88 and cavities 106 can be used.

The non-pneumatic tire assembly 20 further includes a hub 110 which is removably connected to the rim 90. In the shown example of FIG. 2, the hub 110 includes a central portion 114 and a lug 116. The hub 110 can be constructed of any suitable material, including, but not limited to: cast and machined materials, forged materials, powdered metal materials, etc. In one example, the central portion 114 and the lug 116 can be formed of a single, unitary piece.

In one example, the central portion 114 can define a central aperture 118 for interaction with an axle (not shown) as shown in FIG. 1. The central aperture 118 can have a non-circular cross-section, such as having a flat side 120 such that the aperture is "D"-shaped. In another example, the central aperture 118 can have a "double-D" shape. The axle can have a corresponding cross-sectional shape such that rotation of the axle urges rotation of the hub 110.

In the shown example of FIG. 2, the rim 90 includes a ridge 124, and a valley 126 arranged radially around the rim 90. The valley 126 can be the previously described vertical plane 104, and each valley 126 is separated from adjacent valleys 126 by the ridge 124. When the two rim halves 94, 96 are aligned, the ridge 124 from the in-board rim half 94 is aligned with the ridge 124 from the out-board rim half 96 to form a cavity 128 between the two rim halves 94, 96. The lug 116 can be configured to rest within the cavity 128 and interact with the cavity 128 in order to limit rotation of the hub 110 relative to the rim 90.

This arrangement provides a physical interference between cavity side walls 108 and the lug 116 to enable transfer of rotational motion from the hub 110 to the rim 90. As such, the rotational force provided by the power supply rotates the hub 110, and the rotational force is then transferred through the physical interference to rotate the rim 90, which in turn transfers rotational force to the non-pneumatic tire 24. Physical interference between the cavity side walls 108 and the lugs 116 can prevent relative rotational motion between the hub 110 and rim 90. It is to be understood that the geometries and locations of the cavity side walls 108 and the lugs 116 can be designed and manufactured to adequately transfer rotational power for any number of anticipated workloads, torques, environmental conditions, etc.

As can be seen in FIG. 2, as the two rim halves 94, 96 are joined together, the hub 110 is sandwiched between the two pieces of the rim 90, and secure the entire non-pneumatic tire assembly 20 together. In one example, the two pieces of the rim (i.e., rim halves 94, 96) snap into place to capture the non-pneumatic tire 24 and the hub 110. Returning to FIG. 9, the geometry of the rim halves 94, 96 and the non-pneumatic tire 24 can be calculated and manufactured such that a first width 130 of the rim 90 is shorter than a second width 134 of the non-pneumatic tire 24 thereby enabling the assembled rim 90 to exert an axial compression force on the non-pneumatic tire 24. The axial compression force can compress the non-pneumatic tire 24 axially from the dashed outline to the solid outline shown in FIG. 9. Additionally, the axial compression force can be used to pre-load the non-pneumatic tire 24 such that the circumference of the non-pneumatic tire 24 is "crowned" between the two rim halves 94, 96.

While this disclosure has been written in conjunction with the specific embodiments described above, it is evident that many alternatives, combinations, modifications and variations are apparent to those skilled in the art. Accordingly, the described embodiments of this disclosure, as set forth above are intended to be illustrative only, and not in a limiting sense. Various changes can be made without departing from the spirit and scope of this disclosure. Combinations of the above embodiments and other embodiments will be apparent to those of skill in the art upon studying the above description and are intended to be embraced therein. Therefore, the scope of the present disclosure is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A non-pneumatic tire assembly, said non-pneumatic tire assembly comprising:
   a non-pneumatic tire, said non-pneumatic tire comprising:
      an inner circumferential ring and an outer circumferential ring defining an annular space between said circumferential rings and a cylindrical space inside said inner circumferential ring;
      a plurality of partitions within said annular space, wherein said partitions connect said circumferential rings;
      a ground-contacting tread located on said outer circumferential ring;
   a rim, said rim comprises a pair of identical halves, and said rim is located within said cylindrical space; and
   a hub, said hub is removably connected to said rim;
   wherein said rim further comprises a ridge and a valley, and said hub further comprises a lug,
   wherein said ridge from one of the pair of identical halves is aligned with said ridge from the other of the pair of identical halves to form a cavity between said two pieces of said rim,
   wherein said lug is configured to interact with said cavity in order to limit rotation of said hub relative to said rim.

2. The non-pneumatic tire assembly according to claim 1, wherein said hub is sandwiched between the pair of identical halves.

3. The non-pneumatic tire assembly according to claim 1, wherein said rim further comprises a circumferential surface, and said rim defines a cavity on said circumferential surface configured to interact with structure on said non-pneumatic tire to enable transfer of rotational motion from said rim to said non-pneumatic tire.

4. The non-pneumatic tire assembly according to claim 1, wherein said hub defines a non-circular aperture configured to interact with an associated wheel axle.

5. The non-pneumatic tire assembly according to claim 1, further comprising a fastener, wherein said fastener attaches one of the pair of identical rim halves to the other of the pair of identical rim halves, thereby securing the entire non-pneumatic tire assembly together.

6. The non-pneumatic tire assembly according to claim 1, wherein a first width of said rim is shorter than a second width of said non-pneumatic tire thereby enabling application of axial force to said non-pneumatic tire.

7. The non-pneumatic tire assembly according to claim 1, wherein said partitions are non-radial.

8. The non-pneumatic tire assembly according to claim 1, wherein said partitions have a generalized shape selected from the group consisting of a wishbone, an "O," a "V," a "U," a circle, and an oval that repeats around said annular space.

9. The non-pneumatic tire assembly according to claim 1, wherein said partitions define arcuate sides that extend in an axial direction relative to the edges of said circumferential rings.

10. The non-pneumatic tire assembly according to claim 1, wherein said ground-contacting tread comprises a plurality of ridges extending axially across an exterior surface of said outer circumferential ring.

11. The non-pneumatic tire assembly according to claim 10, wherein each ridge of said plurality of ridges includes a height dimension and a circumferential width dimension, wherein an aspect ratio of each ridge comprises a ratio of the height dimension to the width dimension, said aspect ratio of each ridge of said plurality of ridges is between about 1:1 to about 2:1.

12. The non-pneumatic tire assembly according to claim 10, wherein said plurality of ridges comprise a peaked elevation at about the axial center point of the plurality of ridges.

13. The non-pneumatic tire assembly according to claim 10, wherein said plurality of ridges comprise a single ridge portion on one axial side of said outer circumferential ring and a split ridge portion on the other axial side of said outer circumferential ring.

14. The non-pneumatic tire assembly according to claim 13, wherein said adjacent ridges of said plurality of ridges can alternate orientation such that said split ridge portion of one of said plurality of ridges is located on an in-board side of said non-pneumatic tire while said split ridge portion of an adjacent ridge of said plurality of ridges is located on an out-board side of said non-pneumatic tire.

15. The non-pneumatic tire assembly according to claim 1, wherein said inner circumferential ring defines a textured profile on an interior surface to enable cooperation with a rim such that rotational motion of said rim urges rotational motion of said non-pneumatic tire.

16. The non-pneumatic tire assembly according to claim 1, wherein a plurality of generally arcuate sections are assembled to form said non-pneumatic tire.

17. A non-pneumatic tire assembly, said non-pneumatic tire assembly comprising:
    a non-pneumatic tire, said non-pneumatic tire comprising:
        an inner circumferential ring and an outer circumferential ring defining an annular space between said circumferential rings and a cylindrical space inside said inner circumferential ring;
    a plurality of partitions within said annular space, wherein said partitions connect said circumferential rings;
    a ground-contacting tread located on said outer circumferential ring;
    a rim, said rim comprises two identical halves, and said rim is located within said cylindrical space; and
    a hub, said hub is removably connected to said rim, wherein said hub is configured to transmit rotational power to said rim,
    wherein said hub is sandwiched between said two identical halves of said rim,
    wherein said rim further comprises a ridge and a valley, and said hub further comprises a lug,
    wherein said ridge from one of said two identical halves of said rim is aligned with said ridge from the other of said two identical halves of said rim to form a cavity between said two identical halves of said rim,
    wherein said lug is configured to interact with said cavity in order to limit rotation of said hub relative to said rim.

\* \* \* \* \*